May 6, 1924.

J. H. FOX 1,492,975

PROCESS AND APPARATUS FOR MAKING SHEET GLASS

Filed Feb. 9, 1923

4 Sheets-Sheet 1

INVENTOR
John H. Fox
James C. Bradley
atty

May 6, 1924.

J. H. FOX 1,492,975

PROCESS AND APPARATUS FOR MAKING SHEET GLASS

Filed Feb. 9, 1923 4 Sheets-Sheet 2

INVENTOR
John H. Fox
James C. Bradley
Atty

May 6, 1924.

J. H. FOX 1,492,975

PROCESS AND APPARATUS FOR MAKING SHEET GLASS

Filed Feb. 9, 1923 4 Sheets-Sheet 3

INVENTOR
John H. Fox
by
James C. Bradley
atty

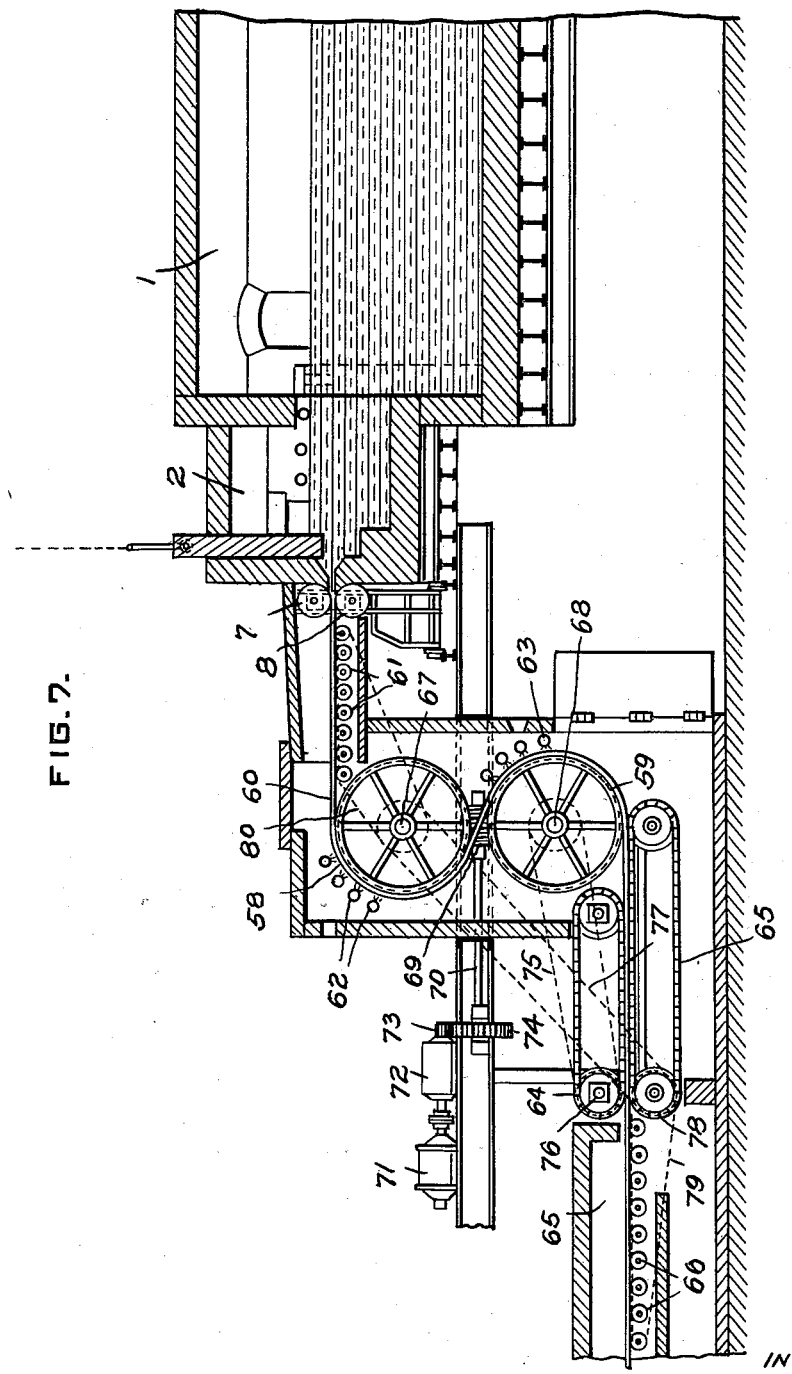

Patented May 6, 1924.

1,492,975

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

PROCESS AND APPARATUS FOR MAKING SHEET GLASS.

Application filed February 9, 1923. Serial No. 618,094.

*To all whom it may concern:*

Be it known that I, JOHN H. Fox, a citizen of the United States, and a resident of Pittsburgh, in the county of Allegheny and State of Pennsylvania, have made a new and useful Invention in Processes and Apparatus for Making Sheet Glass, of which the following is a specification.

Figure 1:
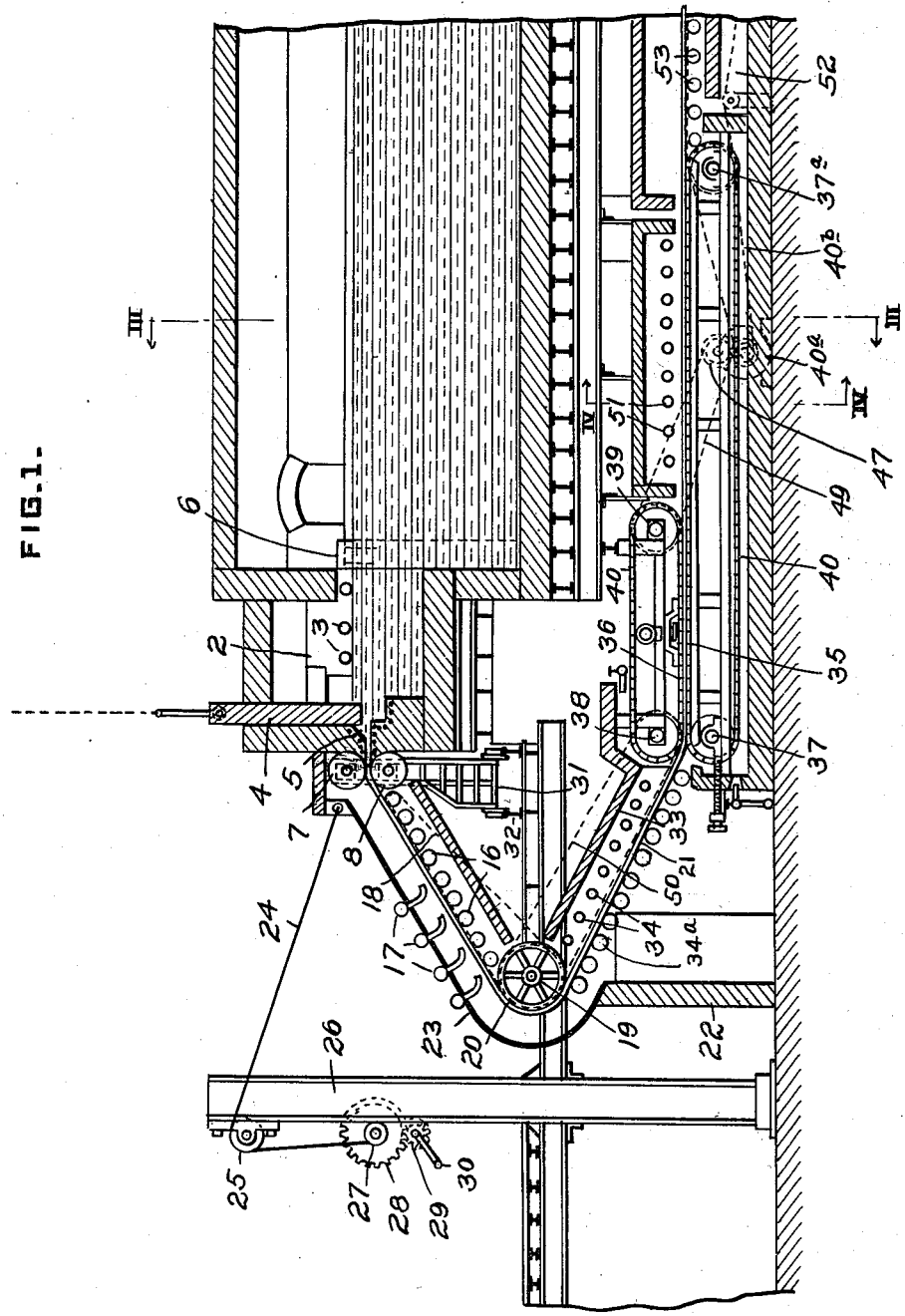
Figure 2:
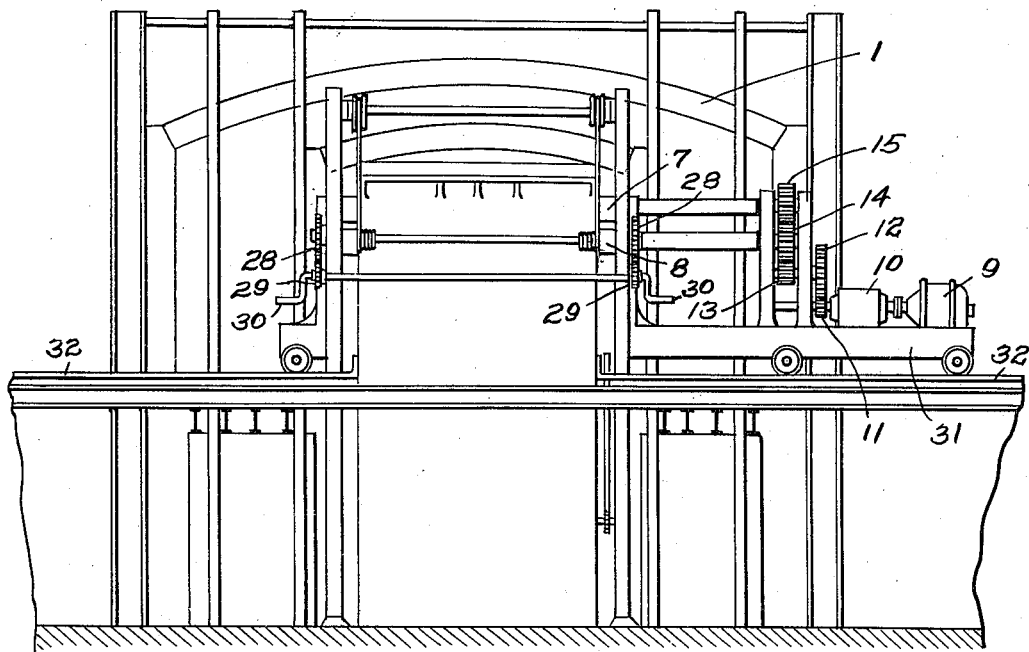
Figure 3:
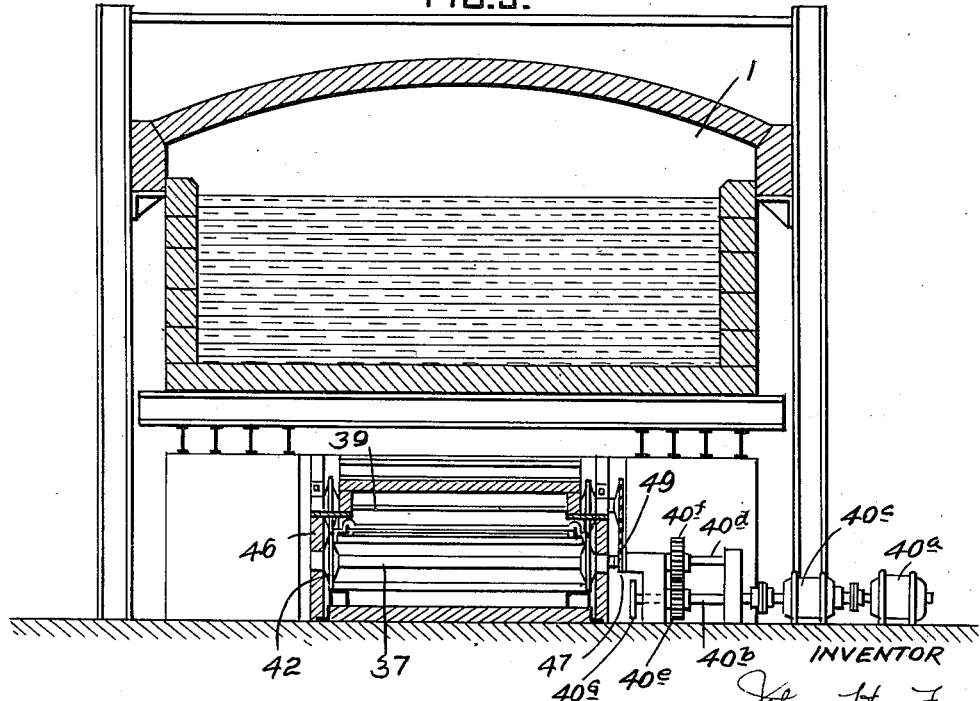
Figure 4:
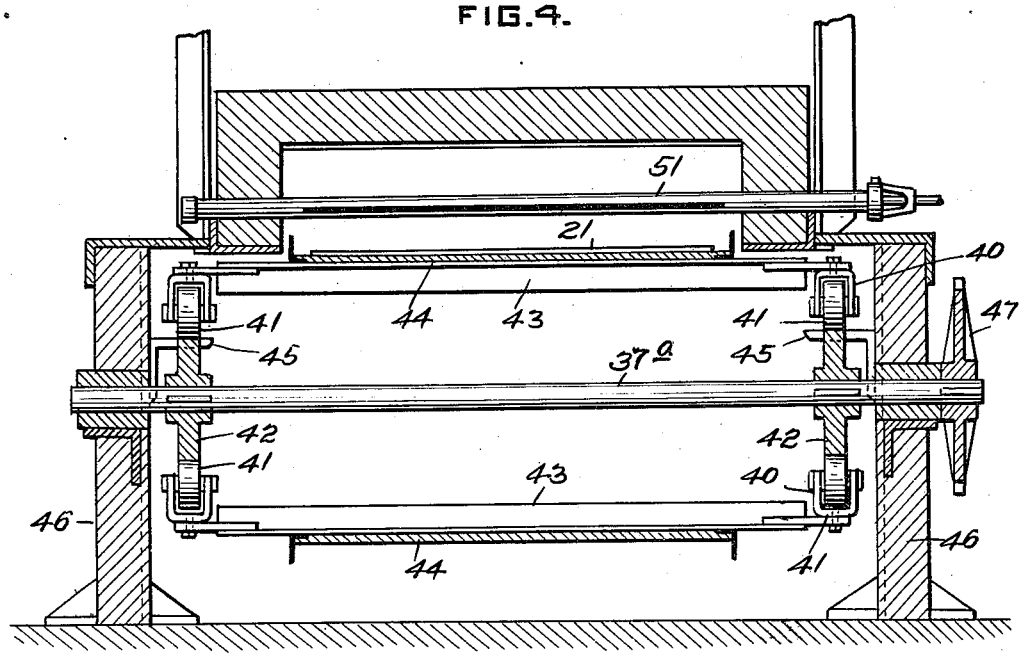
Figure 5:
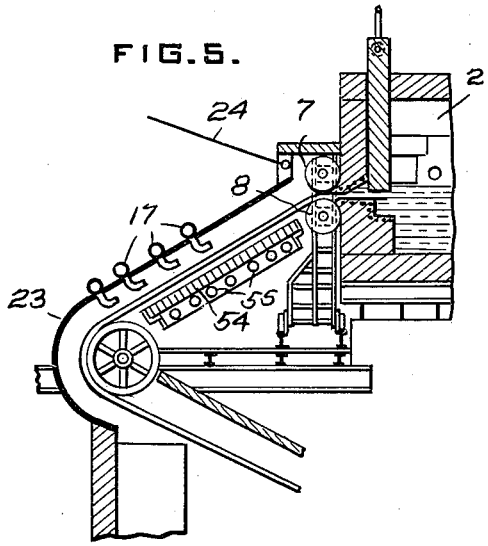
Figure 6:
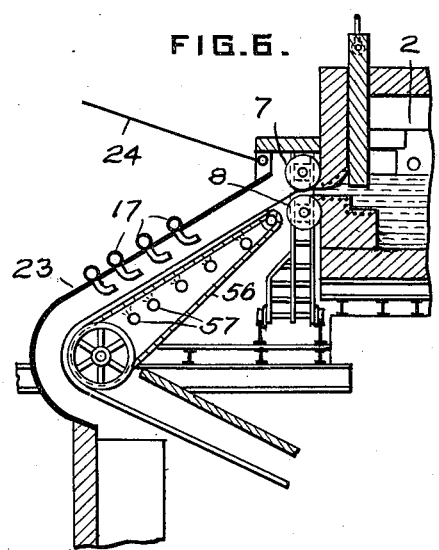

The invention relates to a process and apparatus for producing sheet glass having fire finished surfaces which require no smoothing or polishing. It has for its primary objects the provision of an improved process and apparatus whereby sheet glass of the character specified may be produced continuously and cheaply from a tank. Certain embodiments of the invention are illustrated in the accompanying drawings wherein:

Figure 1 is a vertical section taken through one end of the glass melting tank and showing the invention applied thereto; Fig. 2 is a front view of the apparatus; Fig. 3 is a vertical section on the line III—III of Fig. 1; Fig. 4 is an enlarged section on the line IV—IV of Fig. 1; Fig. 5 is a view corresponding to that of Fig. 1 but illustrating a modification, and Figs. 6 and 7 are vertical sections illustrating still other modifications.

Referring first to the construction of Figs. 1, 2 and 3, 1 is a melting tank preferably of the regenerator type provided at its front end with a forehearth or extension 2 from which the glass is withdrawn. This forehearth is heated in any suitable manner, as by the burners 3 and is provided with a gate 4 by means of which the flow of glass through the outlet slot 5 may be cut off. A floater 6 is preferably employed across the inlet portion of the forehearth in order to prevent the passage of surface impurities from the melting tank into the forehearth or outlet compartment. At the outlet of the passage 5 are a pair of driven water cooled rollers 7 and 8 of the type shown in the Gelstharp application No. 531,053, filed January 23, 1922, such rolls being driven from the motor 9 through the intermediary of the reducing gearing in the casing 10 and the spur gears 11 to 15. These rolls serve to size or form the sheet to a definite thickness and govern the speed at which the sheet is formed. They serve to chill or harden a skin on the upper and lower sides of the sheet so that it holds its shape, but the interior of the sheet after passing the rolls is at a relatively high temperature and plastic.

The sheet as it progresses downwardly from the rolls 7 and 8 is supported upon a table or guideway made up of the series of fluid cooled rollers 16 placed relatively close together to prevent the sheet from sagging therebetween. Above the sheet and opposite the set of rollers 16 is a series of burners 17 adapted to supply a sheet of flame against the face of the sheet. These may be Bunsen burners or some other type, such an oxyacetylene burners, the purpose being to supply a flame of very high temperature in order to fire finish the surface of the sheet. This heating effect is preferably applied only momentarily to each section of the sheet in order to secure the fire finish effect without softening the sheet so that it will sag between the rolls 16. The heat may be applied for a relatively short period and the gas then shut off until another section of the sheet has become positioned beneath the burners after which the gas is again applied. The rolls 16 are preferably driven by means of a sprocket chain 18 which passes along the upper sides of a set of sprockets, one each of which is secured to the outer end of a roller 16, this chain passing at its lower end around a sprocket secured to the outer end of the shaft 19. This shaft is driven as hereinafter described and is provided with a roll 20, preferably of relatively large diameter and having a surface tending to avoid marring the glass, such as carbon, asbestos or highly polished nichrome, around which the glass sheet 21 is turned in order to bring the lower side of the sheet uppermost for the purpose hereinafter set forth.

In order to maintain the glass sheet in uniform temperature condition during the initial portion of the operation, the apparatus is surrounded by the end wall 22, suitable side walls and a swinging top wall 23 of sheet metal. This top wall and the burners 17 carried thereby are adapted to swing around the shaft 19, the curved portion of the top wall during such movement sliding over the upper edge of the wall 22. In order to swing the top wall 23 upward, the cable 24 is provided passing around the pulley 25 on the framework 26 and down to the drum 27. The drum is carried upon a shaft to which is keyed the spur gear 28 and this gear is operated by means of a pinion 29 provided with the turning crank 30. By this means the top wall 23 may be readily swung up out of the way to give access to the rolls 7, 8 and 16 and the other apparatus in the chamber at the front of the tank.

The rolls 7 and 8 are preferably carried upon a truck 31 mounted to move laterally upon rails 32 so that this portion of the apparatus may be moved away from the front of the furnace to give access to the rolls for replacement or repair or to give access to the front wall of the furnace and the slot 5 formed therein.

A baffle wall 33 is preferably employed just above and parallel to the enclosed portion of the glass sheet below the roll 20, and beneath this wall are a series of burners 34 extending through suitable openings in the side walls of the chamber and serving to maintain the glass sheet at temperature such that it may pass into the endless belt or caterpillar construction located at the bottom of the chamber, the sheet opposite the burners being supported by rollers 34ª. The sheet at this point should have sufficient flexibility so that it may curve as indicated in passing between the belts and at the same time shall have its surfaces sufficiently hard so that they will not mar as they come into contact with the belts.

The endless belt handling device comprises a lower endless belt or caterpillar member 35 and an upper belt member 36. The lower member is preferably of about twice the length of the upper member and being arranged to pass around the axles 37 and 37ª, while the upper member passes around the axles 38 and 39. These endless belt members are similarly constructed and each comprise a pair of chains 40 (Fig. 4) carrying rollers 41 at the ends of the links for engagement in suitable recesses in the ends of the sprockets 42 keyed to the ends of the shafts 37 and 37ª and transverse channel members 43 extending between the chains. In order to avoid marring the glass, the members 43 are preferably surfaced with asbestos or carbon as indicated at 44 in Fig. 4. In order to hold the chains against sagging intermediate the sprockets, the angle iron tracks 45 are provided, such angle irons being carried by the walls 46 at the sides of the caterpillar or belt construction. These angle irons support the rollers throughout their travel so that the sheet of glass 21 which engages the asbestos or carbon covered surfaces of the members 43 is held flat as long as it is upon the belt 35.

The two belts are driven from the motor 40ª shown in Figs. 2 and 3. This motor drives the shaft 40ᵇ through the gearing in the reducer casing 40ᶜ and the shaft 40ᵇ drives the shaft 40ᵈ through the spur gears 40ᵉ and 40ᶠ. The shaft 40ᵇ also carries the sprocket wheel 40ᵍ which drives a sprocket on the end of the shaft 37 by means of the sprocket chain 40ʰ (Fig. 2). The shaft 40ᵈ is provided with a sprocket 47 which is geared to a sprocket on the end of the shaft 39 by means of the chain 49. The shaft which carries the roll 19 is provided on its end with a sprocket wheel and this wheel is driven from the shaft 38 by means of a sprocket chain 50 which passes around a suitable sprocket on the end of the shaft 38.

After the glass sheet passes the right hand end of the caterpillar member 36 it is fire finished on the side, which is still unfinished, and which at the time of forming the sheet constituted the lower side thereof. In order to accomplish this result a series of burners 51 are arranged in close proximity to the surface of the sheet and extending along the upper flight of the caterpillar member 35. This series of burners corresponds in function and operation to the series of burners 17 heretofore described, a body of flame being applied at a temperature such that it will fire finish the upper surface of the glass, the exposure of each section of the sheet being for a relatively short time, as heretofore explained, in order to prevent the sheet from being softened during its finishing operation. In this portion of the operation, this quick fire finishing action which stops short of a softening of the entire thickness of the sheet is essential in order to prevent any marring of the lower face of the glass sheet which at this time is in finished condition. At this time it may be desirable even to supply a certain amount of cooling air to the lower side of the belt upon which the glass is supported in order to prevent any such overheating of the lower skin upon the glass such as would permit of its being marred by contact with the belt.

After the sheet is fire finished on its upper side, it passes into the leer 52 which leer is preferably provided with a runway consisting of the rollers 53. The heat supplied at the entrance end of the leer is sufficient to give enough flexibility to the sheet to permit it to flatten without any marring of its surface. The flattening occurs as the sheet moves along over the rollers, the temperature of the leer being gradually lowered as the sheet progresses forwardly. In this way the sheet settles down until it is perfectly flat and hardens in such position. The spacing of the rolls of the leer bears such a relation to the speed of movement of the glass sheet that the softened sheet does not sag between the rollers, but on the contrary flattens as it moves along from the entrance position of relatively high temperature to a position farther along in the leer at which position the glass becomes set and has no further tendency to lose its condition of flatness. The drop in temperature in the leer from this point is so gradual that there is no tendency of the glass to warp. A sheet is produced which is not only flat, but which has a fire finish upon both surfaces, thus avoiding any requirement as to grinding and polishing.

In starting the operation a bait is employed to which the glass ribbon is attached and which is carried around the roller 20 and between the caterpillars 35 and 36. The sheet after passing the sizing rolls 7 and 8 is slightly marred or roughened upon its surface, although this is relatively slight as compared with ordinary cast plate glass. As the sheet passes along the rolls 16, the flame from the burners 17 is applied to fire finish the upper surface of the sheet. The heat applied from these burners is relatively intense, but is applied to each section of the sheet only a short time in order to avoid softening the sheet to such an extent that it sags between the rolls and causes over heating thereof. The rolls are fluid cooled either by air or water to an extent sufficient to prevent the glass from sticking thereto. The sheet is sufficiently flexible to pass around the roll 20 which is also fluid cooled, and in the passage of the sheet from this point to the caterpillars, there is a cooling of the sheet and consequent hardening of its surface to such an extent that it passes between the caterpillars in contact with the carbon or asbestos faces thereof without marring, although the glass as it passes into the caterpillars is sufficiently flexible to make the turn as shown in Fig. 1.

The caterpillars 35 and 36 carry the glass ahead to a point beneath the burners 51, at which time the operation, as heretofore described in connection with the burners 17, is repeated, in order to fire finish the side of the sheet which was down when the sheet passed the burners 17. Here again the application of the heat must be sufficiently intense and of such a short duration that, while the glass is fire finished, it is not heated through so that the lower surface is softened, and for this reason subject to marring by contact with the caterpillar belt 35. The intermittent application of the flame from the burners may be accomplished by turning the gas on and off, in which case, a small pilot light will be employed to secure ignition, or by mounting the burners so that they may be raised and lowered to carry the flame against and away from the sheet as conditions may require. The burners should be arranged so as to apply the gas in a substantially solid flame over the portion of the sheet which is being finished in order to avoid roughening incident to non-uniform heating. The sheet may become warped during this operation, but upon passing into the leer, it becomes straightened as it passes along over the rolls for the reason heretofore set forth, the sheet assuming substantially a uniform temperature from surface to surface so that when it becomes finally set and hardened at a later stage, there is no warping and the sheet remains perfectly flat. The heat as applied in the leer must be carefully governed so as to secure the necessary flattening effect without the application of a heat of such intensity that the fire finished lower surface will become marred.

Fig. 5 illustrates a modification in which a table 54 takes the place of the set of rollers 16 of Fig. 1. This table over which the glass slides is preferably carbon or highly polished monel metal, nichrome or calite, which table may be cooled in any desired manner as by the application of air jets to the under side thereof through the pipes 55 in order to prevent the table from being raised to a temperature at which it will adhere to the glass. In other respects the construction is the same as that of Fig. 7.

Fig. 6 illustrates still another modification in which the endless belt 56 is used instead of the rolls 16 of Fig. 1. This belt is made up of roller chains with transverse plates constructed as heretofore described in connection with the caterpillar 35, the plates or transverse sections being covered with carbon or asbestos. If desired, suitable cooling means may be applied inside the belt in the form of air pipes 57 provided with perforations so that jets of air may be directed against the lower side of the belt.

Fig. 7 shows a substantially different arrangement for accomplishing the function of reversing the sheet so that it may be fire finished first on one side and then on the other, this being accomplished in this construction of Fig. 7 by a pair of rolls 58 and 59 of relatively large diameter, such rolls being preferably covered with asbestos or carbon in order to reduce the danger of marring the sheet. The glass sheet 60 as it comes from the sizing or forming rolls 7 and 8 is supported upon the set of air or water cooled rolls 61 and then passes around the roll 58 beneath the set of burners 62 which perform the function of fire finishing the upper side of the sheet. After the sheet leaves the roll 58 and engages the roll 59, its other surface is fire finished by means of the burners 63.

These sets of burners 62 and 63 are operated in the fire finishing operation in the same manner as heretofore described in connection with the burners of the Fig. 1 construction. After the sheet is fire finished by the burners 63, it passes around the roll between the caterpillar belts 64 and 65, such caterpillar belts being constructed similar to the belts 35 and 36 of Fig. 1. After passing these belts, the glass enters the roller leer 65 and passes along the rolls 66. The shafts 67 and 68 upon which the rolls 58 and 59 are mounted are provided with worm wheels in engagement with and driven from the worm 69. The worm 69 is carried by the shaft 70 and driven from the motor 71 through the gearing in the reducer casing 72 and the spur gears 73 and 74. The caterpillar 64 is driven by means of a sprocket chain 75 which passes around a sprocket on the shaft 68 and a sprocket on the shaft 76 at the end of the caterpillar. The caterpillar 65 is driven from the sprocket chain 77 which passes around a sprocket on the shaft 67 and a sprocket on the shaft 78 at the end of the caterpillar. The rolls 66 of the leer are driven from a chain 79 which passes around a sprocket on the shaft 78 and over sprockets at the ends of the shaft which carry the rolls.

The rolls 61 are driven from a sprocket chain 80 which passes around a sprocket on the shaft 67 and around sprockets on the shafts which carry the rolls. The rolls 58, 59 and 61 are enclosed in a chamber which protects the glass sheet against too sudden changes in temperature and suitable cooling means are used where necessary in connection with all of the rolls and caterpillars in order to secure temperatures which will prevent the glass from sticking or marring.

What I claim is:

1. The process of making sheet glass which consists in conducting molten glass laterally from a relatively large body rolling or sizing the sheet to uniform thickness, fire finishing the upper surface of the sheet as it moves forward, turning the sheet to bring the upper surface down and its other surface up and then fire finishing such other surface which is not up, all during the continuous forward movement of the sheet.

2. The process of making sheet glass which consists in conducting molten glass laterally from a relatively large body, rolling or sizing the sheet to uniform thickness, and then exposing first one side of the sheet and then the other to a fire finishing heat as it moves continuously forward.

3. The process of making sheet glass which consists in conducting molten glass laterally from a relatively large body, rolling or sizing the sheet to uniform thickness, exposing the upper side of the sheet to a fire finishing heat, leading the sheet around a curve to bring the finished side down, permitting such finished side to harden and supporting such finished side while applying a fire finishing heat to the other side of the sheet, all while the sheet moves continuously forward.

4. Apparatus for forming sheet glass comprising a receptacle for carrying a bath of molten glass having a lateral feed opening, means for supporting the sheet after passing the rolls, means for applying a fire finishing heat to the upper surface of the sheet, means for leading the sheet around a curve to bring its finished side down, means for supporting such finished side, and means for applying a fire finishing heat to the other side while so supported.

In testimony whereof, I have hereunto subscribed my name this 2nd day of Feb., 1923.

JOHN H. FOX.